(12) United States Patent
Knudson et al.

(10) Patent No.: US 8,024,763 B2
(45) Date of Patent: *Sep. 20, 2011

(54) INTERACTIVE TELEVISION PROGRAM GUIDE SYSTEM WITH PAY PROGRAM PACKAGE PROMOTION

(75) Inventors: Edward B. Knudson, Littleton, CO (US); Michael D. Ellis, Boulder, CO (US); William L. Thomas, Bixby, OK (US); Bruce L. Davis, Lake Oswego, OR (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/827,940

(22) Filed: Jun. 30, 2010

(65) Prior Publication Data

US 2010/0325673 A1 Dec. 23, 2010

Related U.S. Application Data

(63) Continuation of application No. 11/894,657, filed on Aug. 20, 2007, now Pat. No. 7,774,812, which is a continuation of application No. 11/439,693, filed on May 23, 2006, now Pat. No. 7,603,690, which is a continuation of application No. 09/418,461, filed on Oct. 15, 1999, now Pat. No. 7,069,576, which is a continuation of application No. 08/944,153, filed on Oct. 6, 1997, now Pat. No. 6,016,141.

(51) Int. Cl.
*H04N 5/445* (2011.01)
*H04N 7/173* (2011.01)
*G06F 13/00* (2006.01)
*G06F 3/00* (2006.01)

(52) U.S. Cl. ............. 725/105; 725/37; 725/87; 725/104

(58) Field of Classification Search ................ 725/37, 725/39, 87, 104–105
See application file for complete search history.

(56) References Cited

U.S. PATENT DOCUMENTS 4,694,490 A 9/1987 Harvey et al.
(Continued)

FOREIGN PATENT DOCUMENTS
AU 735093 6/2001
(Continued)

OTHER PUBLICATIONS

Brugliera, V., "Digital On-Screen Display: A New Technology for the Consumer Interface", Symposium Record: Cable TV Sessions—18th International Television Symposium and Technical Exhibition, Jun. 1993, pp. 571-586. Cox, J., et al., "Extended Services in a Digital Compression System", Proceedings From Eleven Technical Sessions: 42nd Annual Convention and Exposition of the National Cable Television Association, Jun. 1993, pp. 185-191.

(Continued)

Primary Examiner — Hunter B Lonsberry
(74) Attorney, Agent, or Firm — Ropes & Gray LLP

(57) ABSTRACT

A system is provided that allows a user to select a pay program for purchase from a program guide. The program guide determines whether the selected program is part of a package of pay programs. If the selected program is part of a package, information regarding the package is provided to the user so that the user may decide whether to purchase the package. If the selected program is part of several packages, information for all packages is provided. The system automatically sets reminders for packages containing repetitive programming. The system monitors whether the user has watched any of the programs in such packages. When the user watches a program from the package, the remaining reminders are cancelled. If a user does not watch any programs in a package of any type, purchase of the package is cancelled and the user is provided with the opportunity to reschedule.

42 Claims, 11 Drawing Sheets

U.S. PATENT DOCUMENTS

| | | | |
|---|---|---|---|
| 4,706,121 A | 11/1987 | Young | |
| 4,905,094 A | 2/1990 | Pocock et al. | |
| 4,937,863 A | 6/1990 | Robert et al. | |
| 4,965,825 A | 10/1990 | Harvey et al. | |
| 4,977,455 A | 12/1990 | Young | |
| 4,991,011 A | 2/1991 | Johnson et al. | |
| 4,992,940 A | 2/1991 | Dworkin | |
| 5,038,211 A | 8/1991 | Hallenbeck | |
| 5,077,607 A | 12/1991 | Johnson et al. | |
| 5,172,413 A | 12/1992 | Bradley et al. | |
| 5,204,897 A | 4/1993 | Wyman | |
| 5,208,665 A | 5/1993 | McCalley et al. | |
| 5,210,611 A | 5/1993 | Yee et al. | |
| 5,237,157 A | 8/1993 | Kaplan | |
| 5,249,044 A | 9/1993 | Von Kohorn | |
| 5,260,999 A | 11/1993 | Wyman | |
| 5,311,423 A | 5/1994 | Clark | |
| 5,323,234 A | 6/1994 | Kawasaki et al. | |
| 5,325,423 A | 6/1994 | Lewis | |
| 5,343,239 A | 8/1994 | Lappington et al. | |
| 5,347,167 A | 9/1994 | Singh | |
| 5,353,121 A | 10/1994 | Young et al. | |
| 5,357,276 A | 10/1994 | Banker et al. | |
| 5,404,393 A | 4/1995 | Remillard | |
| 5,412,720 A | 5/1995 | Hoarty | |
| 5,416,508 A | 5/1995 | Sakuma et al. | |
| 5,451,998 A | 9/1995 | Hamrick | |
| 5,465,113 A | 11/1995 | Gilboy | |
| 5,479,266 A | 12/1995 | Young et al. | |
| 5,497,185 A | 3/1996 | Dufresne et al. | |
| 5,504,519 A | 4/1996 | Remillard | |
| 5,523,794 A | 6/1996 | Mankovitz et al. | |
| 5,532,754 A | 7/1996 | Young et al. | |
| 5,539,635 A | 7/1996 | Larson, Jr. | |
| 5,539,822 A | 7/1996 | Lett | |
| 5,559,548 A | 9/1996 | Davis et al. | |
| 5,561,708 A | 10/1996 | Remillard | |
| 5,581,479 A | 12/1996 | McLaughlin et al. | |
| 5,583,560 A | 12/1996 | Florin et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,509 A | 1/1997 | Florin et al. | |
| 5,596,373 A | 1/1997 | White et al. | |
| 5,600,364 A | 2/1997 | Hendricks et al. | |
| 5,619,274 A | 4/1997 | Roop et al. | |
| 5,621,456 A | 4/1997 | Florin et al. | |
| 5,627,940 A | 5/1997 | Rohra et al. | |
| 5,640,501 A | 6/1997 | Turpin | |
| 5,640,577 A | 6/1997 | Scharmer | |
| 5,659,350 A | 8/1997 | Hendricks et al. | |
| 5,661,517 A | 8/1997 | Budow et al. | |
| 5,664,111 A | 9/1997 | Nahan et al. | |
| 5,671,276 A | 9/1997 | Eyer et al. | |
| 5,671,411 A | 9/1997 | Watts et al. | |
| 5,694,176 A | 12/1997 | Bruette et al. | |
| 5,699,125 A | 12/1997 | Rzeszewski et al. | |
| 5,715,314 A | 2/1998 | Payne et al. | |
| 5,715,399 A | 2/1998 | Bezos | |
| 5,724,521 A | 3/1998 | Dedrick | |
| 5,727,163 A | 3/1998 | Bezos | |
| 5,734,853 A | 3/1998 | Hendricks et al. | |
| 5,759,101 A | 6/1998 | Von Kohorn | |
| 5,812,205 A | 9/1998 | Milnes et al. | |
| 5,819,034 A | 10/1998 | Joseph et al. | |
| 5,867,226 A | 2/1999 | Wehmeyer et al. | |
| 5,912,664 A | 6/1999 | Eick et al. | |
| 5,926,230 A | 7/1999 | Niijima et al. | |
| 5,936,428 A | 8/1999 | Merritt et al. | |
| 5,945,987 A | 8/1999 | Dunn | |
| 5,960,411 A | 9/1999 | Hartman et al. | |
| 5,990,927 A | 11/1999 | Hendricks et al. | |
| 5,995,092 A | 11/1999 | Yuen et al. | |
| 6,005,565 A | 12/1999 | Legall et al. | |
| 6,005,631 A | 12/1999 | Anderson et al. | |
| 6,008,803 A | 12/1999 | Rowe et al. | |
| 6,016,141 A | 1/2000 | Knudson et al. | |
| 6,020,880 A | 2/2000 | Naimpally | |
| 6,133,909 A | 10/2000 | Schein et al. | |
| 6,151,059 A | 11/2000 | Schein et al. | |
| 6,172,677 B1 | 1/2001 | Stautner et al. | |
| 6,307,398 B2 | 10/2001 | Merritt et al. | |
| 6,314,577 B1 | 11/2001 | Pocock | |
| 6,357,043 B1 | 3/2002 | Ellis et al. | |
| 6,362,942 B2 | 3/2002 | Drapkin et al. | |
| 6,472,905 B1 | 10/2002 | Manning | |
| 6,526,575 B1 | 2/2003 | McCoy et al. | |
| 6,850,693 B2 | 2/2005 | Young et al. | |
| 2003/0208756 A1 | 11/2003 | Macrae et al. | |

FOREIGN PATENT DOCUMENTS

| | | |
|---|---|---|
| AU | 7556701 | 11/2001 |
| AU | 757778 | 3/2003 |
| CA | 2 304 221 | 4/1999 |
| CA | 2 554 487 | 4/1999 |
| JP | 04-127688 | 4/1992 |
| JP | 06-153109 | 5/1994 |
| JP | 07-297796 | 11/1995 |
| JP | 08-289218 | 11/1996 |
| JP | 08-289219 | 11/1996 |
| JP | 08-289281 | 11/1996 |
| JP | 09-37168 | 2/1997 |
| JP | 9-97295 | 4/1997 |
| JP | 3832805 | 7/2006 |
| JP | 4085115 | 2/2008 |
| JP | 4518774 | 5/2010 |
| WO | WO 90/00847 | 1/1990 |
| WO | WO 93/26121 | 12/1993 |
| WO | WO 94/13107 | 6/1994 |
| WO | WO-94/14282 A1 | 6/1994 |
| WO | WO-94/14283 A1 | 6/1994 |
| WO | WO-94/14284 A1 | 6/1994 |
| WO | WO 95-01056 | 1/1995 |
| WO | WO 95/06389 | 3/1995 |
| WO | WO-95/28799 A1 | 10/1995 |
| WO | WO-95/30961 A1 | 11/1995 |
| WO | WO-95/32583 A1 | 11/1995 |
| WO | WO-95/32585 | 11/1995 |
| WO | WO-96/07270 | 3/1996 |
| WO | WO 96/08927 | 3/1996 |
| WO | WO-96/09721 | 3/1996 |
| WO | WO-96/21990 | 7/1996 |
| WO | WO-96/34491 | 10/1996 |
| WO | WO-96/38799 | 12/1996 |
| WO | WO-96/41477 | 12/1996 |
| WO | WO 98/17064 | 4/1998 |
| WO | WO 99/18721 | 4/1999 |

OTHER PUBLICATIONS

Markowitz, A., "Companies Jump on Interactive Bandwagon", Discount Store News, Dec. 6, 1993, pp. 4 and 131.

Sussman, A., "GTE Tunes in to Home TV Shopping", PC Week, Jun. 28, 1988, p. C15.

"Technology: Turn on, tune in and print out—An experimental interactive television service is set to alter our viewing habits", Financial Times (London), Oct. 14, 1993, p. 11.

Japanese Office Action dated Sep. 7, 2009, Serial No. 2006-141978.

Office Actions, Corresponding Replies and Notice of Allowance in relation to U.S. Patent No. 6,357,043 issued Mar. 12, 2002.

Wahren, Reinhard "Der counter lauft: Interaktives Fernsehen," RFE, pp. 14-16 (Feb. 1994) (Englishe Translation attached).

"Internet Access: DISC Distributing Announces Interactive World Wide" Cambridge Work-Group Computing Report, Cambridge Publishing, Inc., bearing a copyright date of Nov. 13, 1995, http://www.elibrary.com/id/101/101/getdoc.[...]ocid=1007497@library_a&dtype=0-0&dinst-0.

"Technology: Turn on, tune in and print out—Anexperimental interactive television service is set to alter our viewing habits", Financial Times (London), Oct. 14, 1993,p. 11.

Feb. 8, 1996 Amendment in Response to office Action in relation to U.S. Appl. No. 08/428,809.

US 6,118,443, 09/2000, Allison et al. (withdrawn)

48

| | 9:00PM | 9:30 | 10:00 |
|---|---|---|---|
| REQ 1 | PROGRAM 1 | | |
| REQ 2 | PROGRAM 1 | PROGRAM 2 | |
| REQ 3 | PROGRAM 1 | PROGRAM 2 | PROGRAM 3 |
| PRESS "OK" TO ORDER | | | |

YOU SELECTED: MEN'S 100m FREESTYLE

THIS EVENT IS AVAILABLE AS PART OF
THE FOLLOWING PACKAGES:

• OLYMPIC SWIMMING - ENJOY 3 DAYS
  OF SWIMMING EVENTS $29.95
• OLYMPIC SWIMMING HIGHLIGHTS $19.95

OR ORDER INDIVIDUALLY:

• MEN'S 100m FREESTYLE $1.95

FIG. 8

INTERACTIVE TELEVISION PROGRAM GUIDE SYSTEM WITH PAY PROGRAM PACKAGE PROMOTION

CROSS-REFERENCE TO RELATED APPLICATION

This application is a continuation of U.S. patent application Ser. No. 11/894,657, filed Aug. 20, 2007, which is a continuation of U.S. patent application Ser. No. 11/439,693, filed May 23, 2006, now U.S. Pat. No. 7,603,690, which is a continuation of U.S. patent application Ser. No. 09/418,461, filed Oct. 15, 1999, now U.S. Pat. No. 7,069,576, which is a continuation of U.S. patent application Ser. No. 08/944,153, filed Oct. 6, 1997, now U.S. Pat. No. 6,016,141, the contents of which are hereby incorporated by reference into the present disclosure in their entireties.

BACKGROUND OF THE INVENTION

This invention relates to interactive television program guide systems, and more particularly, to program guide systems that allow pay programs to be promoted as part of one or more packages.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may desire to view a grid of program listings organized in a channel-ordered list. Alternatively, the user may desire to view program listings organized by time, by theme (movies, sports, etc.), or by title (i.e., alphabetically ordered). A user may purchase a pay program from a program guide by placing a highlight region on a desired program listing and pressing an "OK" button.

Cable system operators sometimes offer pay programming in packages. Various types of packages are available. For example, a "time block" package allows a user to purchase a block of time on a particular channel. A "pay-per-day" package includes multiple consecutive airings of a single program. A "special event" package includes a number of special programming events. A "season ticket" package includes all sports programs of a specific league or team for the duration of the sports season. A "premium multiplex" package includes authorization for more than one premium subscription channel and typically is available for a monthly fee. An "a la carte" package includes authorization for a selectable subset of a number of subscription channels.

A user may order a package by calling a customer service representative or by using an automated phone ordering system. However, it has generally not been possible to use program guides to order packages or to obtain information on packages. As a result, users often use program guides to purchase pay programs individually without realizing that the purchased programs are part of an available package.

It is therefore an object of the present invention to provide an interactive television program guide that supplies information on pay program packages and facilitates the ordering of such packages.

SUMMARY OF THE INVENTION

This and other objects of the invention are accomplished in accordance with the principles of the present invention by providing a system that allows a user to select a pay program for purchase from an interactive program guide. The program guide determines whether the selected program is part of one or more packages of pay programs. If the selected program is part of a package of programs, the user is provided with information regarding the package, so that the user may purchase the package if desired. If the selected program is part of multiple packages, information on each package may be provided.

When a user purchases a package, the program guide determines whether the package contains repetitive programming (e.g., whether the package involves the continuous broadcast of a single movie during a given 24 hour period). If the package contains repetitive programming, the program guide automatically sets reminders for each program in the package subsequent to any reminder set by the user. Just before the scheduled broadcast time of each program in the package, the program guide displays a suitable reminder message on the user's television.

The program guide monitors the user's activity to determine whether the user has watched any of the programs in a repetitive package (e.g., by determining whether the user has turned on the set-top box and tuned the set-top box to the channel for a program in the package during its scheduled broadcast time.) If the user has not watched any of the programs in the package, the program guide continues to issue reminders just before each program is broadcast. Once the user watches one of the programs in the package, the remainder of the reminders are cancelled.

The program guide also monitors the user's activity to determine whether the user has failed to watch any of the programs in purchased package. If the user does not watch any of the programs in a purchased package, the program guide cancels the purchase. The user may be provided with an opportunity to reschedule the cancelled package if the package is still available for purchase.

Further features of the invention, its nature and various advantages will be more apparent from the accompanying drawings and the following detailed description of the preferred embodiments.

BRIEF DESCRIPTION OF THE DRAWINGS

FIG. 2 is an illustrative program guide display screen in accordance with the present invention.

FIG. 8 is an illustrative program guide display screen for use when purchasing a program that is part of multiple packages or is individually purchasable as well as being part of a package in accordance with the present invention.

DETAILED DESCRIPTION OF THE PREFERRED EMBODIMENTS

Figure 1:
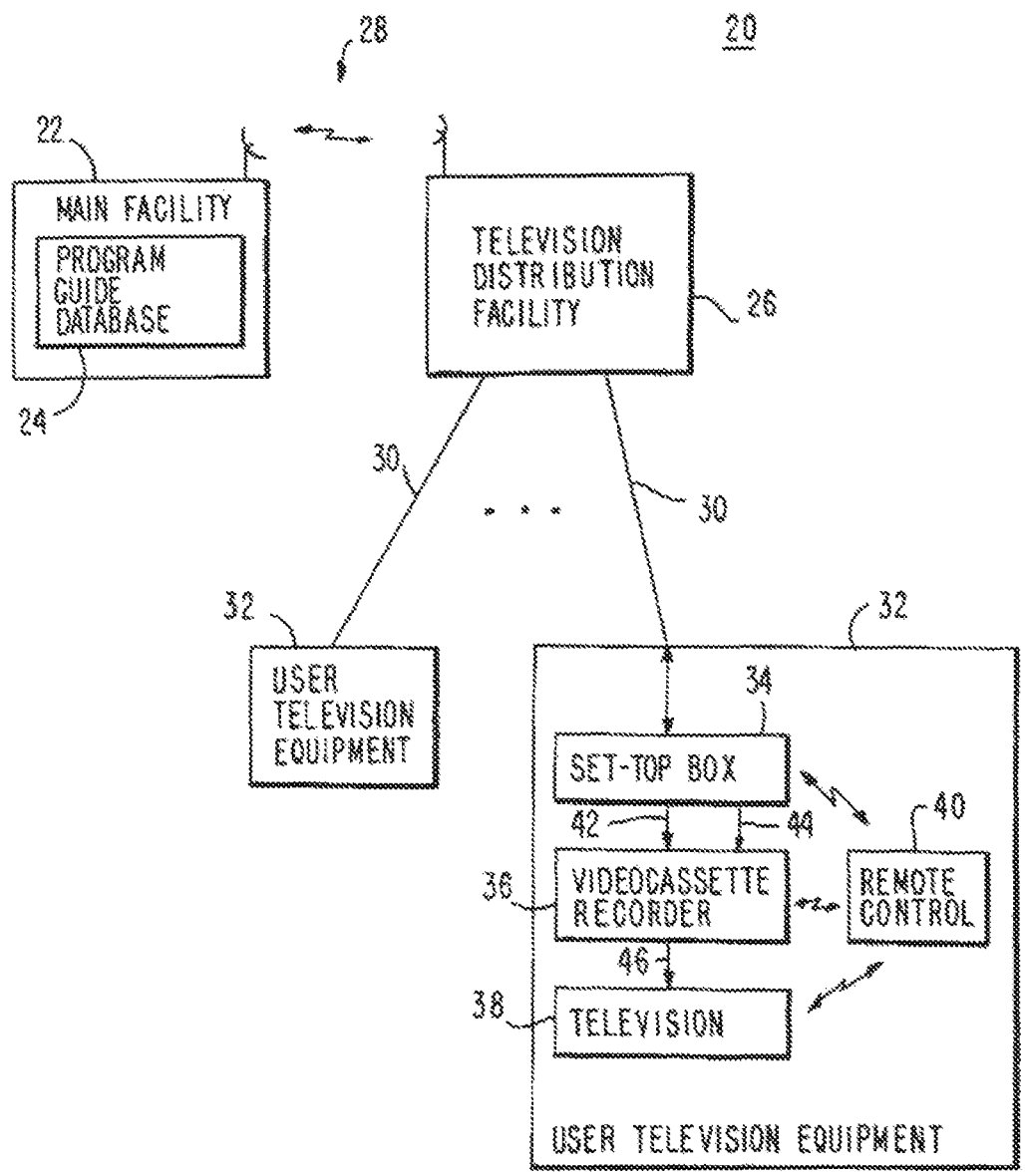
FIG. 1 is a schematic diagram of a system in accordance with the present invention.

An illustrative program guide system 20 in accordance with the present invention is shown in FIG. 1. Main facility 22 provides television program data from program guide database 24 to television distribution facility 26 via communications link 28. Link 28 may be a satellite link, a telephone network link, a cable or fiber optic link, a microwave link, a combination such links, or any other suitable communications path. Television distribution facility 26 may be a cable system headend, a broadcast distribution facility, or a satellite television distribution facility.

The program data transmitted by main facility 22 to television distribution facility 26 includes television program listings data such as program times, channels, titles, descriptions, etc. Transmitted program data also includes pay program data such as pricing information for individual programs and packages, time windows for ordering programs and packages, telephone numbers for placing orders that cannot be impulse ordered, etc. If desired, some of this data may be provided using data sources at facilities other than main facility 22. For example, data related to pay program order processing (e.g., billing data and the like) may be generated by an order processing and billing system that is separate from television distribution facility 26.

Television distribution facility 26 distributes the program data to multiple users via communications paths 30. Each user has user television equipment 32. Program data may be distributed to user television equipment 32 periodically (e.g., once each week). Television distribution facility 26 may also poll user equipment 32 periodically for certain information (e.g., pay program account information or information regarding programs that have been purchased and viewed using locally-generated authorization techniques).

User television equipment 32 typically contains equipment such as set-top box 34, an optional videocassette recorder 36, and television 38. Set-top box 24 may be controlled by remote control 40 or other user input interface such as a wireless keyboard, mouse, trackball, etc.

Set-top box 34 contains a microprocessor and other circuitry for executing instructions to support an interactive television program guide with pay-per-view services. The program guide may be implemented on set-top box 34 or may be implemented on user television equipment other than a set-top box if desired. For clarity, the present invention will be illustrated in connection with a set-top box implementation.

Communications paths 30 preferably have sufficient bandwidth to allow television distribution facility 26 to distribute scheduled television programming, pay programming, and other video information to user equipment 32 in addition to program data. If desired, program data may be distributed by one or more distribution facilities that are similar to but separate from television distribution facility 26 using communications paths that are separate from communications paths 30.

Certain functions such as pay program purchasing may require user equipment 32 to transmit data to distribution facility 26 over communications paths 30. If desired, such data may be transmitted over telephone lines or other separate communications paths (not shown). If functions such as these are provided using facilities separate from television distribution facility 26, some of the communications with user equipment 32 may be made directly to the separate facilities.

Multiple television channels (analog, digital, or both analog and digital) may be provided to set-top box 34 via communications path 30. During normal television viewing, the user tunes set-top box 34 to a desired one of these channels. The signal for that television channel may be provided at video output 42 as a radio-frequency (RF) signal on a predefined channel (e.g., channel 3 or 4) or as a demodulated video signal. The video signal at output 42 is received by optional videocassette recorder 36, so that the user may record programs. Program recording and other features may be controlled by set-top box 34 using control path 44.

Television 38 may receive RF or demodulated video signals from videocassette recorder 36 via path 46. The video signals on path 46 may either be generated by videocassette recorder 36 when playing back a prerecorded videocassette or may by passed through from set-top box 34. The video signals provided to television 38 are typically real-time video signals such as for broadcast television programs or pay programs.

Remote control 40 may have cursor keys, an "enter," "select," or "OK" button, a "guide" button, a "record" button, and various other control buttons. When the user presses the "guide" button, set-top box 34 invokes the interactive program guide and displays an appropriate screen of program listings on television 38.

A typical program guide display is a grid of television program listings such as grid 48 of FIG. 2. Each row of grid 48 contains program listings information for a different television channel such as the network channels or the pay channels shown in FIG. 2. Columns of grid 48 are associated with different scheduled broadcast times for the programs (e.g., 9:00 PM, 9:30 PM, and 10:00 PM). The program listings format of grid 48 is illustrative only. Any other suitable type of program listings display format may be used, such as a table or other list. Moreover, grid 48 is only one display screen of many display screens that are generally presented to the user during use of the program guide. Other program guide display screens are generated for promoting pay programs and packages of pay programs, for setting reminders, and for ordering pay programming.

In a program listings grid such as grid 48 of FIG. 2 and other program guide display screens, a highlight region such as highlight region 50 may be used to define the current position of the user. The user positions highlight region 50 using the cursors on remote control 40 (FIG. 1). If highlight region 50 is positioned on a pay program that the user desires to purchase, the user can order that program by pressing the "OK," "enter," or "select" button. This causes the program guide to display various pay program ordering menus on television 38.

The "OK" button can be used in conjunction with the cursor keys to navigate through program guide menus and to respond to various queries from the program guide. If desired, the functions of the dedicated "OK," "guide," and "record," buttons and various other control buttons on remote control 40 may be provided in the form of suitable menu options that the user may select using the cursor keys and a button such as the "OK" button. In addition, other dedicated buttons may be provided on remote control 40 if desired.

When a user selects a pay program for purchase from the program guide (e.g., by pressing the "OK" button after highlighting a desired program listing in grid 48), the system determines whether the program is part of a package of pay programs available from the operator of television distribution facility 26. If the program is part of a package, information about the package is provided to the user in the form of various informative messages displayed on television 38.

Figure 3:
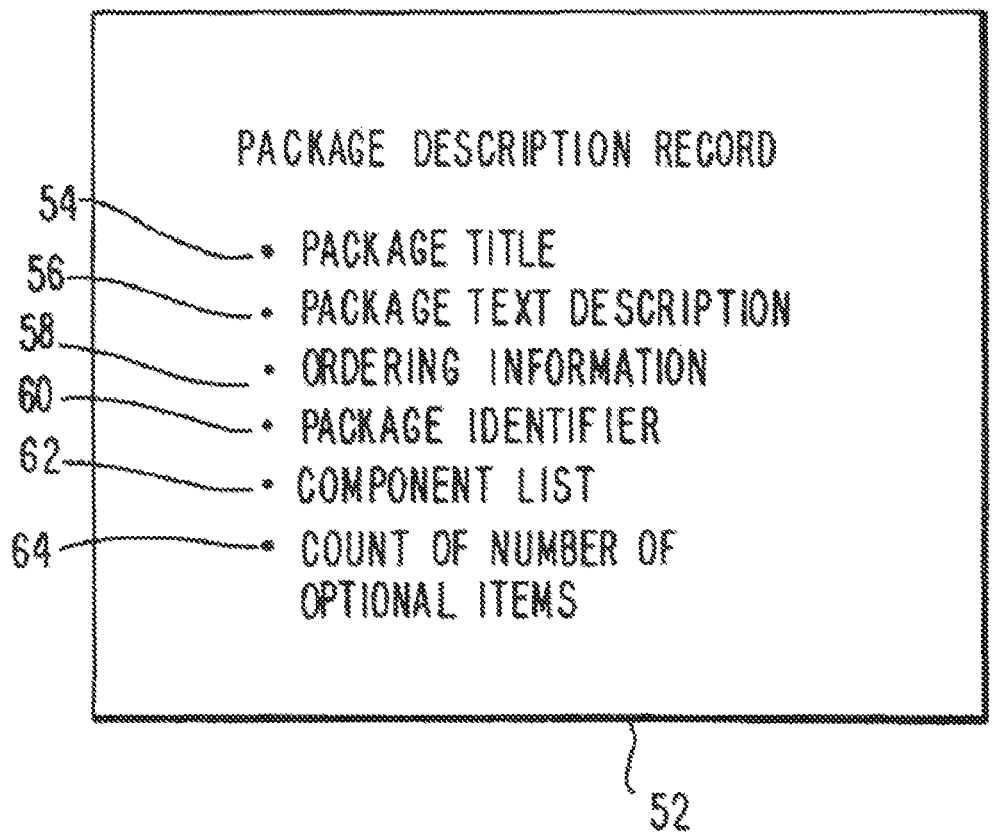
FIG. 3 is a diagram of an illustrative package description record in accordance with the present invention.
Figure 4:
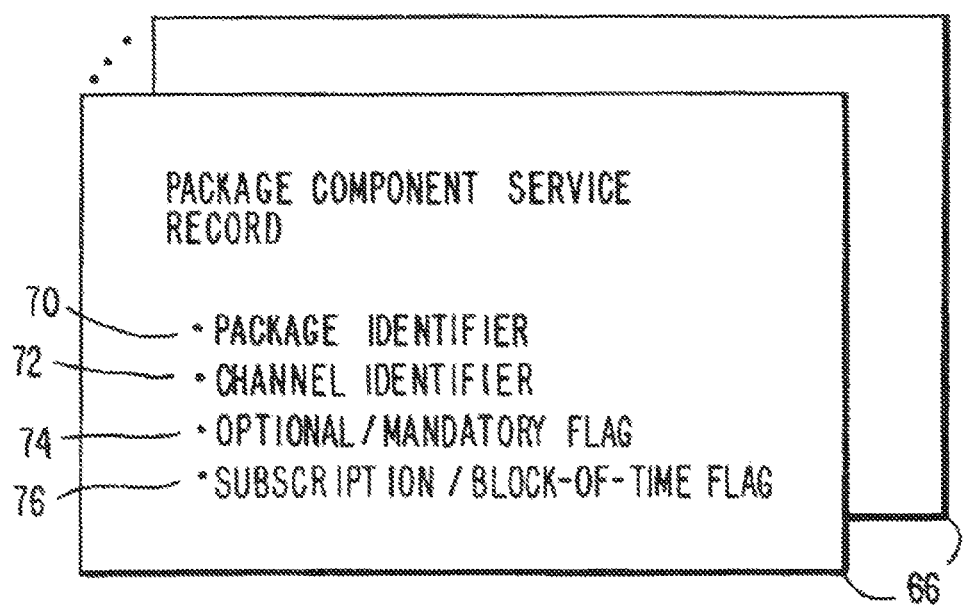
FIG. 4 is a diagram of an illustrative package component service record in accordance with the present invention.
Figure 5:
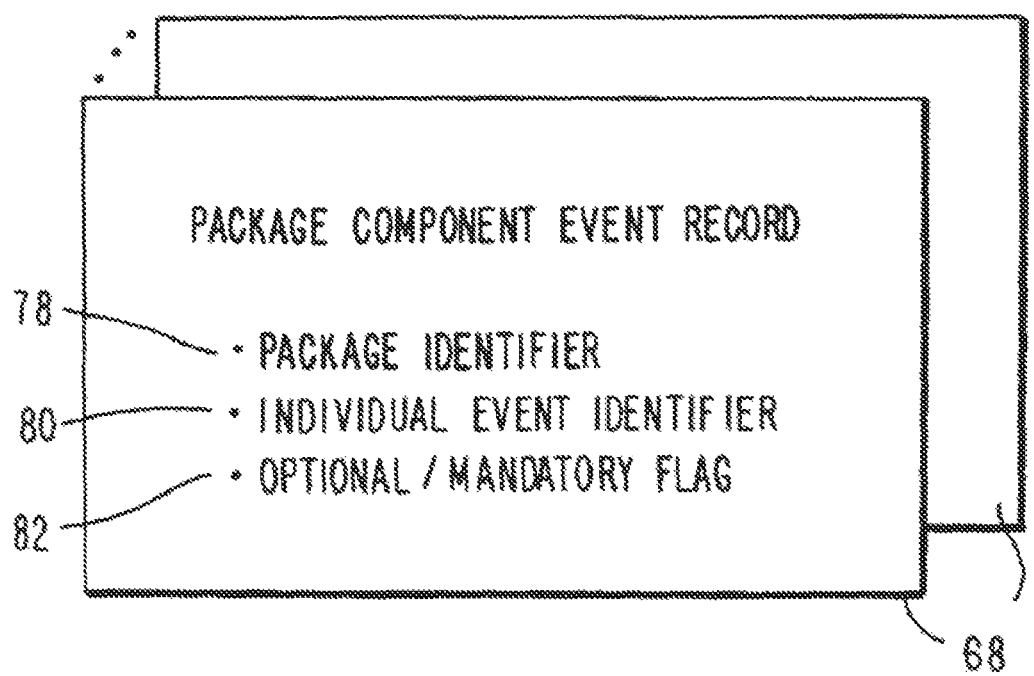
FIG. 5 is a diagram of an illustrative package component event record in accordance with the present invention.

Information concerning the various pay program packages that are available may be provided to set-top box 34 from program guide database 24 via television distribution facility 26. Suitable data structures for handling pay program packages are shown in FIGS. 3-5. As shown in FIG. 3, each package may have an associated package description record 52. Package description record 52 has package title 54, package text description 56, and ordering information 58. Ordering information 58 may include a telephone number for placing telephone orders, an expiration date for the offer, a time window for ordering, and package type information (e.g., whether the package is a time block package, a pay-per-day package, etc.) Each package description record 52 also includes package identifier 60 and component list 62. Component list 62 is a list of package components, such as the channels that make up a package of premium channels or the individual programs that make up a package of multiple programs.

The provider of the package may not wish to make all of the components of the package optional. For example, a premium multiplex package may include one or more mandatory premium channels in addition to a variety of optional channels. The number of channels that are optional in such a package is included in the package description record 52 (i.e., count of number of optional items 64).

Each component in the component list 62 preferably has either an associated package component service record 66 (FIG. 4) (e.g., if the package is a package of services such as premium channels) or a package component event record 68 (FIG. 5) (e.g., if the package is a package of individual programs).

As shown in FIG. 4, each package component service record 66 preferably includes package identifier 70 and channel identifier 72. Package identifier 70 is used to indicate the packages with which component service record 66 is associated. Channel indicator 72 identifies each component (e.g., by its call letters or other suitable label). Optional/mandatory flag 74 is used to indicate whether the component associated with the package component service record 66 is an optional or a mandatory component. Subscription/block-of-time flag 76 is used to indicate whether the component is associated with a subscription package or is associated with a block of time on a channel. If the component is associated with a time block package, the start and stop time of the time block are preferably provided with subscription/time block flag 76.

As shown in FIG. 5, each package component event record 68 preferably includes package identifier 78 and individual event identifier 80. Optional/mandatory flag 82 is used to indicate whether the component associated with the package component event record 68 is an optional or a mandatory component.

One illustrative package is a premium multiplex package. The package description record 52 (FIG. 3) of such a package may have a package title 54 of "Movie Lovers Special." The package text description 56 may be "Subscribe to any 3 premium channels for $5.99/month." Ordering information 58 may include information identifying the package as a premium multiplex package. The components in component list 62 may be premium movie channels. Count of number of optional items 64 may be 7.

Each premium channel in component list 62 has an associated package component service record 66 (FIG. 4). The package identifier 70 in each such package component service record 66 identifies the associated premium multiplex package. The channel identifiers 72 of each premium channel may be the call letters of the channel. Optional/mandatory flag 74 may be set to "mandatory" for some of the components in component list 62 and set to "optional" for other components. Subscription/time block flag 76 may be set to "subscription."

Another illustrative package is a package of Olympic swimming events. The package description record 52 (FIG. 3) of such a package may have a package title 54 of "Olympic Swimming." The package text description 56 may be "Enjoy 3 days of swimming events." Ordering information 58 may include information identifying the package as a special event package. Component list 62 may include swimming events such as men's 100 m freestyle, women's 100 m backstroke, men's 400 m relay, etc. Count of number of optional items 64 may be "none."

Each swimming event in component list 62 may have an associated package component event record 68 (FIG. 5). The package identifier 78 in each such package component event record 68 identifies the associated Olympic swimming package. Individual event identifiers 80 uniquely identify each event. Optional/mandatory flag 82 may be set to "mandatory" for each swimming event component in list 62.

These examples are illustrative only. Pay programs may be provided in any suitable type of pay program packages. Package types that may be used include a "time block" package that allows a user to purchase a block of time on a particular channel, a "pay-per-day" package that includes multiple consecutive airings of a single program, a "special event" package that includes multiple components of special programming events, a "season ticket" package that include all sports programs of a specific league or team for the duration of the sports season, a "premium multiplex" package that includes authorization for more than one premium subscription channel, an "a la carte" package that may involve authorization for a selectable subset of a number of subscription channels, etc.

Figure 6:
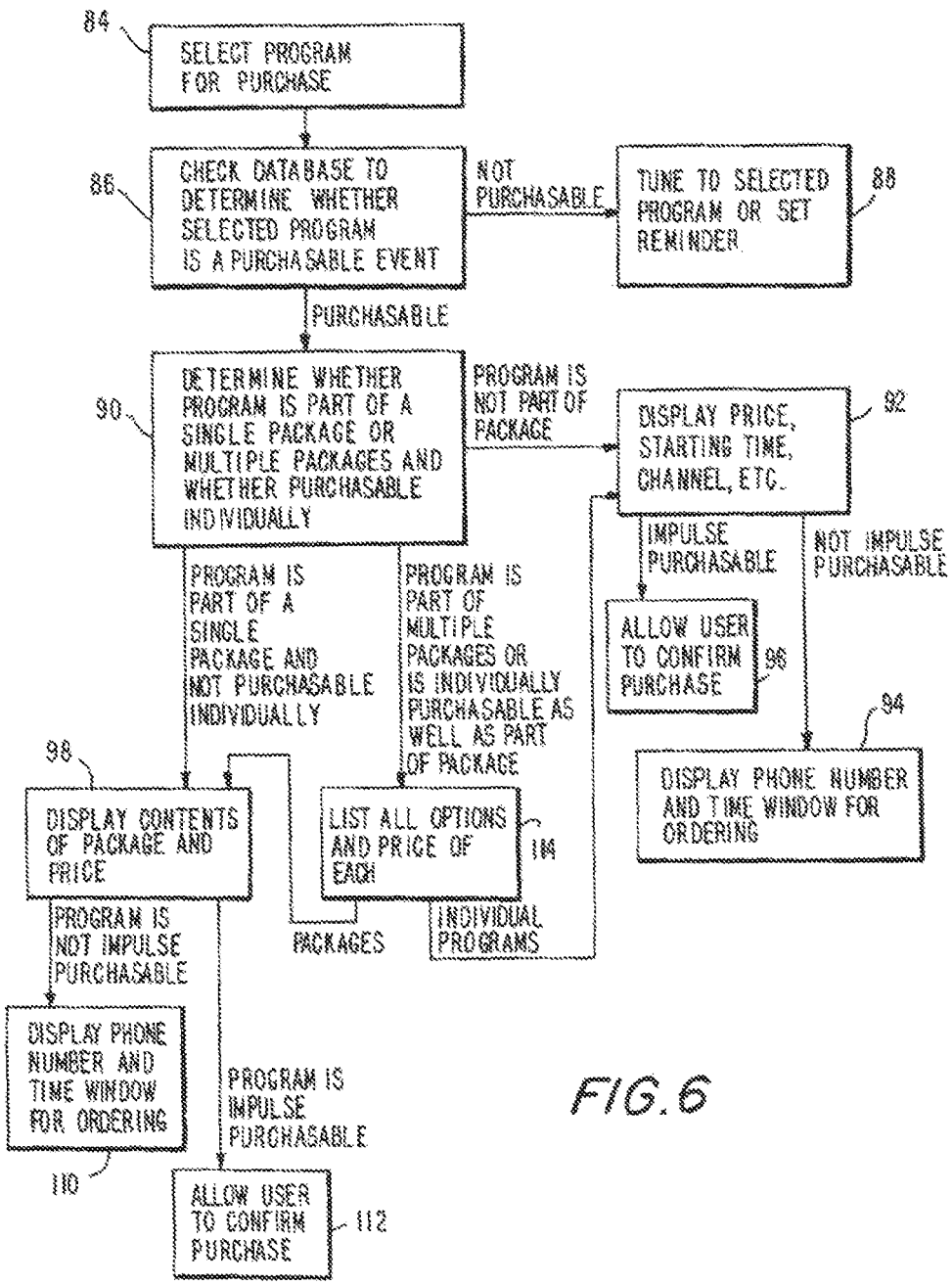
FIG. 6 is a flow chart of illustrative steps involved in purchasing pay programs and packages of pay programs in accordance with the present invention.

When the user selects a program for purchase, the interactive electronic program guide implemented on set-top box 34 determines whether the selected program is part of a package. If the selected program is part of a package, the program guide provides the user with information on the package. Steps involved in this process are shown in FIG. 6.

At step 84, the program guide allows a user to select a program for purchase (e.g., by highlighting a desired program listing in a grid such as grid 48 of FIG. 2). At step 86, the program guide checks its database (stored in memory in set-top box 34) to determine whether the selected event is a purchasable pay program. If the selected event is not a pay program, at step 88 the system tunes to the channel for the selected event (if the event is currently being broadcast) or allows the user to set up a reminder (if the event is scheduled to be broadcast in the future).

If the selected event is purchasable, at step 90 the system determines whether the selected program is part of a single package or multiple packages and whether it is purchasable individually. If the program is not part of a package, the price, starting time, channel, etc. of the selected program may be displayed at step 92.

The user's options after the price and other information regarding the selected program have been displayed at step 92 depend on the availability of the program for impulse purchasing from the program guide. If the operator at television distribution facility 32 has not made the selected program impulse purchasable to users, the user must typically order the program by telephone. Information to facilitate such telephone orders (e.g., the telephone number to call for ordering, the ordering time window, etc.) is displayed on television 38 at step 94. If the selected program is available for impulse purchase from the program guide, the user is allowed to confirm purchase of the selected program at step 96. Steps 94 and 96 may be performed using the same display screen that is used in performing step 92.

Figure 7:
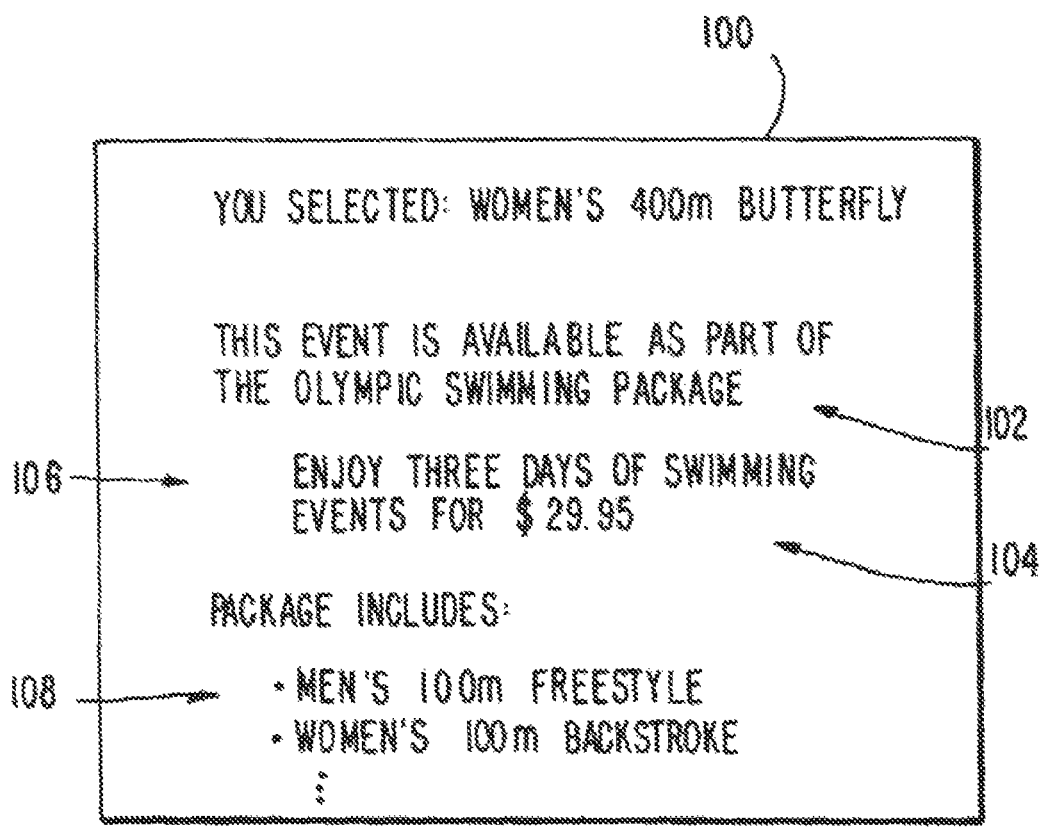
FIG. 7 is an illustrative program guide display screen for use when purchasing a program that is part of a single package and not available for purchase individually in accordance with the present invention.

If at step 90 the program guide determined that the selected program is part of a single package and is not purchasable individually, the package of which the program is a part is displayed at step 98. For example, if the selected program is a women's 400 m butterfly swimming event and that program is part of the Olympic swimming package, an informative message such as message 100 of FIG. 7 may be displayed on television 38. Message 100 contains the package title 102, package price 104, package description 106, and may include a list of the events 108 that make up the package. The user may select the package for purchase (e.g., by placing a highlight on top of package title 102 or on top of an on-screen "order" button with cursors and pressing an "OK" button or by any other suitable technique).

If the user selects the package for purchase at step 98, the user is provided with an opportunity to complete the purchase of the package at step 110 or 112. If the program is not available for impulse purchase from the program guide, the telephone number and time window for ordering the program may be displayed at step 110. If the program is available for impulse purchase, the program guide allows the user to confirm the purchase of the selected program at step 112. The display screen used in performing steps 110 and 112 may be the same display screen used in performing step 98.

If at step 90 the program guide determined that the selected program is part of multiple packages or is individually purchasable as well as being part of a package, the program guide lists all available program purchase options and their prices at step 114. For example, if the selected program is men's 100 m freestyle and that event is available either as part of the Olympic swimming package, the Olympic swimming highlights package, or for purchase as an individual event, a message such as message 116 of FIG. 8 may be displayed. The user may select the one of the packages or the individual event for purchase (e.g., using a highlight and an "OK" button) at step 114. If the user selects an individual program for purchase, purchasing information (price, starting time, channel, etc.) for that program may be displayed at step 92 and the program purchased in steps 94 or 96. If the user selects one of the packages for purchase, the contents of each package is displayed at step 98 and the user is allowed to purchase that package in steps 110 or 112.

Figure 9:
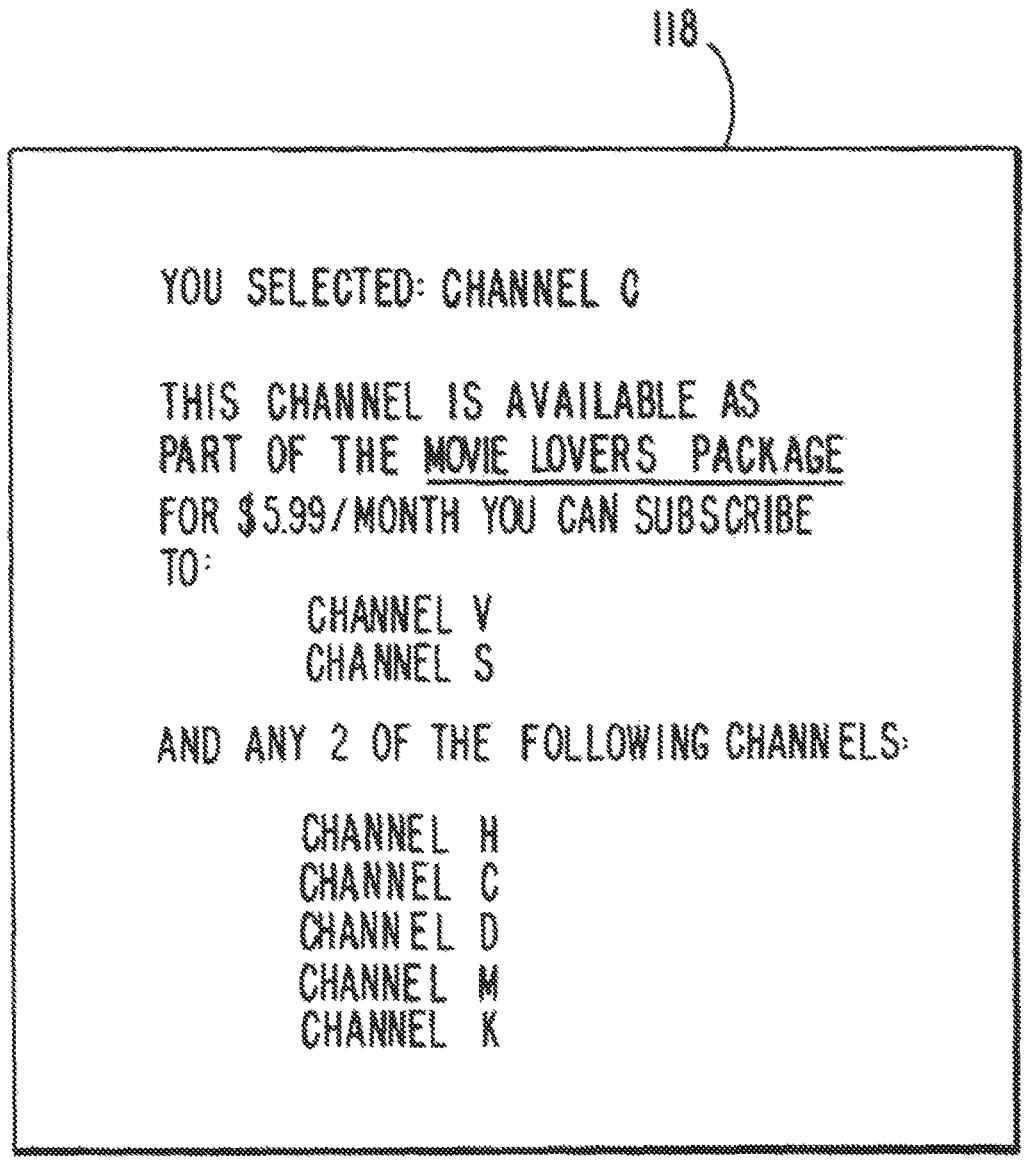
FIG. 9 is an illustrative program guide display screen for use when purchasing a subscription to a channel that is part of a package of channels available for subscription in accordance with the present invention.

If desired, a user who selects an individual channel for purchase may be presented with information on packages which contain the selected channel. For example, a user who selects a particular premium movie channel for purchase may be provided with a display screen such as display screen 118 of FIG. 9. In the example of FIG. 9, the user selected channel C for purchase. Because channel C is available for purchase as part of the movie lovers package, the user is provided with information on the contents of that package. Channels V and S are mandatory channels. Channels H, C, D, M, and K are optional channels.

Another aspect of the invention relates to setting reminders for programs that are part of packages. If a reminder has been set, set-top box 34 will generate a reminder message on the display of television 38 just prior to the scheduled broadcast time of the program. Any suitable type of reminder may be generated. For example, a reminder may be generated that asks if the user wishes to tune to the selected program. If the user answers affirmatively, set-top box 34 tunes to the channel for the selected program. A reminder might also be generated that simply reminds the user that the selected program is about to begin. Another type of reminder that may be used automatically tunes set-top 34 box to its associated event at the scheduled start time of the event.

Figure 10:
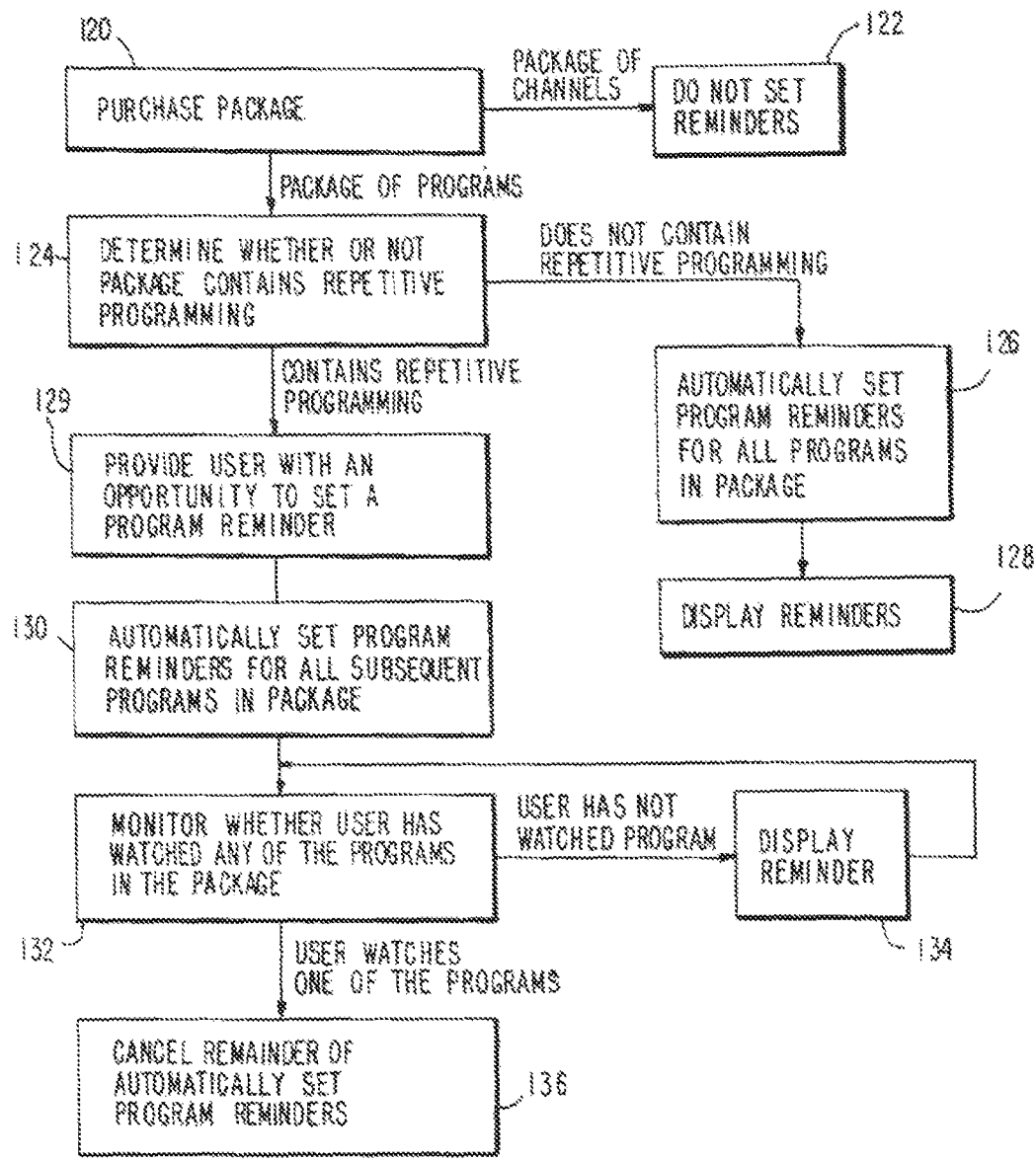
FIG. 10 is a flow chart of illustrative steps involved in setting automatic reminders for purchased programs in accordance with the present invention.

Steps involved in setting program reminders for packages are shown in FIG. 10. At step 120, the user is provided with an opportunity to select a package from the program guide for purchase. The program guide determines whether the selected package is a package of channels. If the selected package is a package of channels, no reminders are set (step 122).

If the package is a package of programs, the program guide determines whether the package contains repetitive programming at step 124. A typical package that contains repetitive programming is a pay-per-day movie package in which the same movie is broadcast repeatedly over a 24 hour period. The user may watch the movie during any of its broadcasts during the 24 hour period.

If the program guide determines that the package does not contain repetitive programming at step 124, the program guide automatically sets program reminders for all programs in the package at step 126. Just before each program is aired, the program guide displays a suitable reminder at step 128.

If the program guide determines that the package contains repetitive programming at step 124, the program guide provides the user with an opportunity to set a program reminder at step 129. The program guide automatically sets program reminders for all subsequent programs in the package at step 130. The program guide monitors whether the user has watched any of the programs in the package at step 132 (e.g., by determining whether set-top box 34 has been turned on and tuned to the channel for a given program during its scheduled broadcast time). If the user has not yet watched any of the programs in the package, a reminder is displayed for the next scheduled program in the package at step 134. However, if the user watches one of the programs in the repetitive programming package, at step 136 the program guide cancels the remainder of the program reminders that were set at step 132. This approach prevents the program guide from generating numerous unwanted reminders for the unwatched broadcasts in a pay-per-day package after the user has watched one of the broadcasts.

Figure 11:
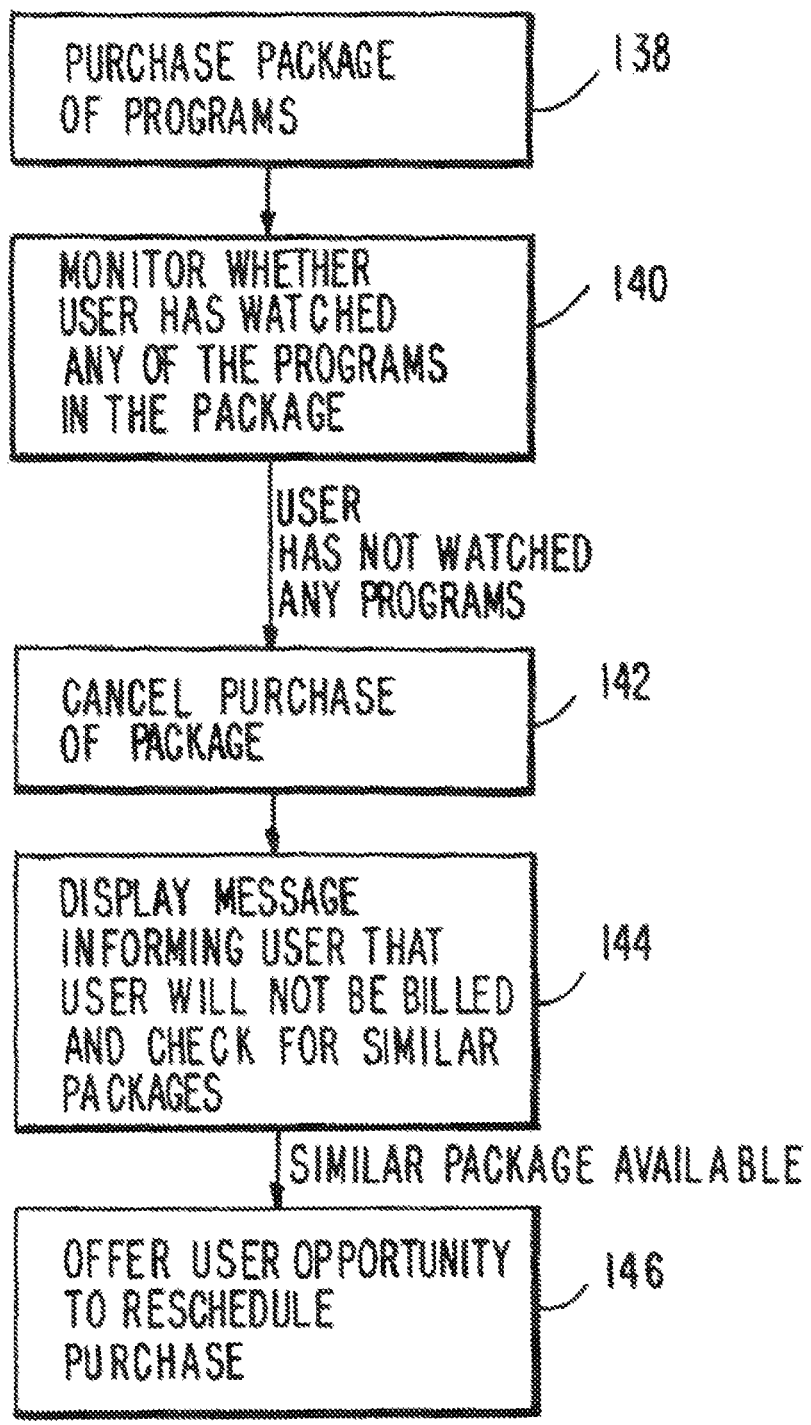
FIG. 11 is a flow chart of illustrative steps involved in cancelling and rescheduling pay program purchases in accordance with the present invention.

Sometimes it may not be possible for a user to watch any of the programs in a package that the user has purchased. The program guide may handle this type of situation using the approach shown in FIG. 11. At step 138, the program guide allows a user to purchase a package of programs (e.g., by highlighting a desired package, pressing the "OK" button, etc.) At step 140, the program guide monitors the user's activity to determine whether the user has watched any of the programs in the package (e.g., by determining whether the user has turned on set-top box 34 and tuned to the appropriate channel during the scheduled broadcast time of a program in the package). If the user has not watched any of the programs in the package, the program guide cancels the purchase of the package at step 142. If desired, the cancellation of the purchased package at step 142 may take place at the expiration of the "purchase window" for the package, which is typically somewhat shorter in length than the entire package and which typically expires a half hour or hour before the end of the package. The program guide displays a message informing the user that the user will not be billed for the cancelled package at step 144.

Because the user was interested in the package, the program guide also determines if there is a similar package still available (e.g., another pay-per-day package for the same program that is available on another day). If a similar package is available, the program guide presents the user with an opportunity to reschedule the purchase of the package at step 146.

The foregoing is merely illustrative of the principles of this invention and various modifications can be made by those skilled in the art without departing from the scope and spirit of the invention.

What is claimed is:

1. A system that allows a user to purchase a package of components for display, the system comprising user equipment on which a program guide is implemented, wherein said program guide is configured to:
provide the user with an opportunity to select an individually-purchasable component for purchase;
determine whether the selected component is part of a package; and
present the user with an opportunity to purchase the package of which the selected component is a part when it is determined that the selected component is part of the package.

2. The system defined in claim 1, wherein the selected component is one of the group consisting of a program, a channel and an event.

3. The system defined in claim 1, wherein the program guide is further configured to provide a customizable package of components that includes the selected component.

4. The system defined in claim 3, wherein the customizable package of components includes at least one optional component that is selectively includable in the customizable package.

5. The system defined in claim 3, wherein the customizable package of components includes an optional component and a mandatory component.

6. The system defined in claim 3, wherein the customizable package is associated with a block of time.

7. The system defined in claim 1, wherein the package comprises components that share a common theme.

8. The system defined in claim 7, wherein the common theme relates to a specific set of sporting events.

9. The system defined in claim 8, wherein the specific set of sporting events includes a plurality of sports programs of a specific league.

10. The system defined in claim 8, wherein the specific set of sporting events includes a plurality of sports programs of a specific team.

11. The system defined in claim 1, wherein the program guide is further configured to determine whether the selected component is part of a single package, and whether the selected component is part of multiple packages.

12. The system defined in claim 1, wherein the program guide is further configured to display purchasing information for the selected component.

13. The system defined in claim 1, wherein the program guide is further configured to display information on each package of which the selected component is a part when the selected component is included in at least one package.

14. The system defined in claim 1, wherein the program guide is further configured to display a telephone number for ordering the package.

15. The system defined in claim 1, wherein the program guide is further configured to provide the user with an opportunity to impulse purchase the package through the program guide.

16. The system defined in claim 1, wherein the program guide is further configured to determine whether the purchased package contains repetitive programming.

17. The system defined in claim 1, wherein the program guide is further configured to allow the user to set a reminder for at least one component in the purchased package.

18. The system defined in claim 1, wherein the program guide is further configured to automatically set reminders for each component in the purchased package.

19. The system defined in claim 1, wherein the program guide is further configured to monitor whether the user has watched any of the components in the purchased package.

20. The system defined in claim 19, wherein the program guide is further configured to cancel the purchase of the purchased package when it is determined that the user has not watched any of the components in the purchased package.

21. The system defined in claim 20, wherein the program guide is further configured to offer the user an opportunity to reschedule a cancelled package.

22. A method for allowing a user to purchase a package of components for display, the method comprising:
providing the user with an opportunity to select an individually-purchasable component for purchase;
determining whether the selected component is part of a package; and
presenting the user with an opportunity to purchase the package of which the selected component is a part when it is determined that the selected component is part of the package.

23. The method defined in claim 22, wherein the selected component is one of the group consisting of a program, a channel and an event.

24. The method defined in claim 22, wherein the program guide is further configured to provide a customizable package of components that includes the selected component.

25. The method defined in claim 24, wherein the customizable package of components includes at least one optional component that is selectively includable in the customizable package.

26. The method defined in claim 24, wherein the customizable package of components includes an optional component and a mandatory component.

27. The method defined in claim 24, wherein the customizable package is associated with a block of time.

28. The method defined in claim 22, wherein the package comprises programs that share a common theme.

29. The method defined in claim 28, wherein the common theme relates to a specific set of sporting events.

30. The method defined in claim 29, wherein the specific set of sporting events includes a plurality of sports programs of a specific league.

31. The system defined in claim 29, wherein the specific set of sporting events includes a plurality of sports programs of a specific team.

32. The method defined in claim 22, further comprising determining whether the selected component is part of a single package, and whether the selected component is part of multiple packages.

33. The method defined in claim 22, further comprising displaying purchasing information for the selected component.

34. The method defined in claim 22, further comprising displaying information on each package of which the selected component is a part when the selected component is included in at least one package.

35. The method defined in claim 22, further comprising displaying a telephone number for ordering the package.

36. The method defined in claim 22, further comprising providing the user with an opportunity to impulse purchase the package through the program guide.

37. The method defined in claim 22, further comprising determining whether the purchased package contains repetitive programming.

38. The method defined in claim 22, further comprising allowing the user to set a reminder for at least one component in the purchased package.

39. The method defined in claim 22, further comprising automatically setting reminders for each component in the purchased package.

40. The method defined in claim 22, further comprising monitoring whether the user has watched any of the components in the purchased package.

41. The method defined in claim 40, further comprising cancelling the purchase of the purchased package when it is determined that the user has not watched any of the components in the purchased package.

42. The method defined in claim 41, further comprising offering the user an opportunity to reschedule a cancelled package.

* * * * *